United States Patent [19]
Jakobsen

[11] 3,960,019
[45] June 1, 1976

[54] CANNISTER ARRANGEMENT OF TRANSDUCERS TO MONITOR PRESSURES
[75] Inventor: William J. Jakobsen, Farmingdale, N.Y.
[73] Assignee: Lourdes Industries, Inc., Hauppauge, N.Y.
[22] Filed: June 28, 1974
[21] Appl. No.: 484,097

[52] U.S. Cl. .............................. 73/420; 73/40.5 R; 73/398 AR; 73/431; 338/41
[51] Int. Cl.² ...................... G01L 9/02; G01L 7/06
[58] Field of Search ............ 73/398 AR, 40, 40.5 R, 73/420, 431 R, 410; 338/42, 41

[56] References Cited
UNITED STATES PATENTS

| | | | |
|---|---|---|---|
| 1,926,808 | 9/1933 | Hastings | 73/431 |
| 1,999,771 | 4/1935 | Mample | 73/420 |
| 2,785,570 | 3/1957 | Mounteer et al. | 73/398 AR |
| 2,870,301 | 1/1959 | Tikanen | 338/41 |
| 2,966,257 | 12/1969 | Littlejohn | 73/431 |
| 2,976,506 | 3/1961 | Bourns | 73/398 AR |
| 3,172,069 | 3/1965 | Marks et al. | 338/41 |

Primary Examiner—Donald O. Woodiel
Attorney, Agent, or Firm—Roberts & Cohen

[57] ABSTRACT

For monitoring a plurality of pressurized cables and supplying electrical signals in accordance therewith, there is provided a cannister arrangement of transducers. The cannister is provided with a closure by which the cannister is pivotally mounted. The closure is provided with a plurality of bores through which pressure medium can be transmitted. The transducers are mounted on the closure and communicate through the bores with a plurality of armored hoses supplying pressurized medium originating in the pressurized cables which are being monitored. A plurality of wires ae bundled together into a cable which is mounted on the closure, the wires extending through the closure for connection to printed circuits which lead to contacts with which the transducers make electrical connection. The wires connect the transducers to a monitoring device or the like. The arrangement is particularly suitable for use in connection with monitoring pressurized telephone cables.

30 Claims, 6 Drawing Figures

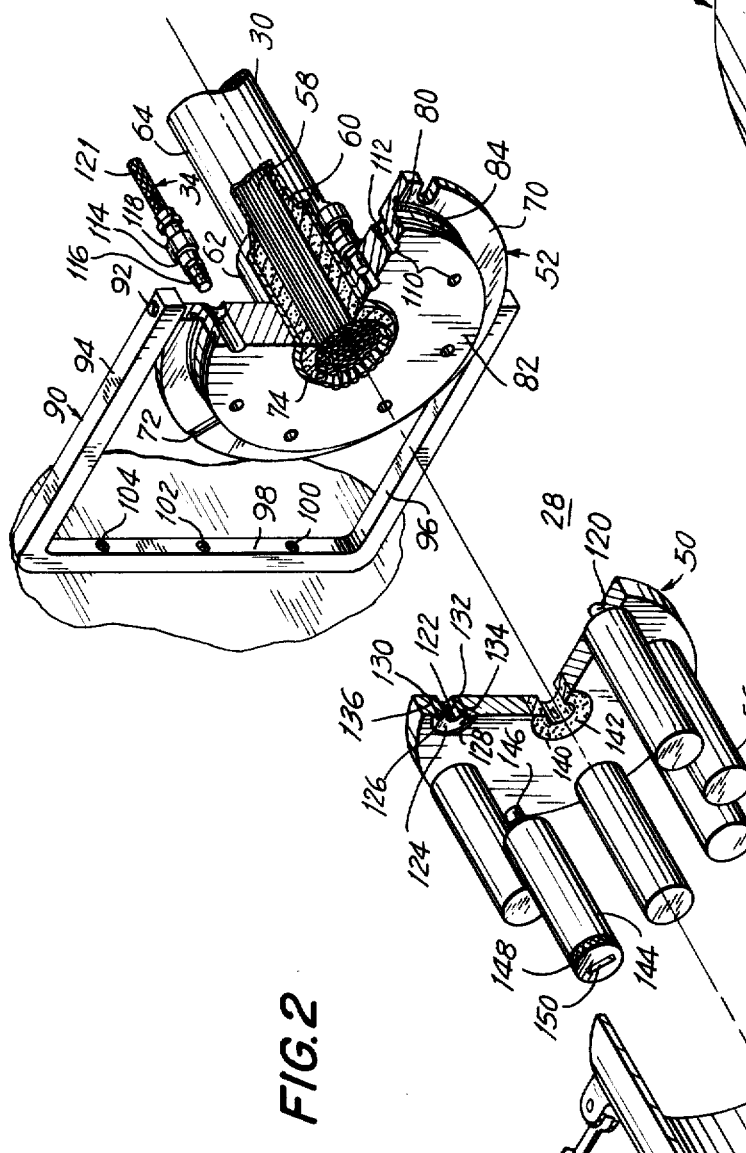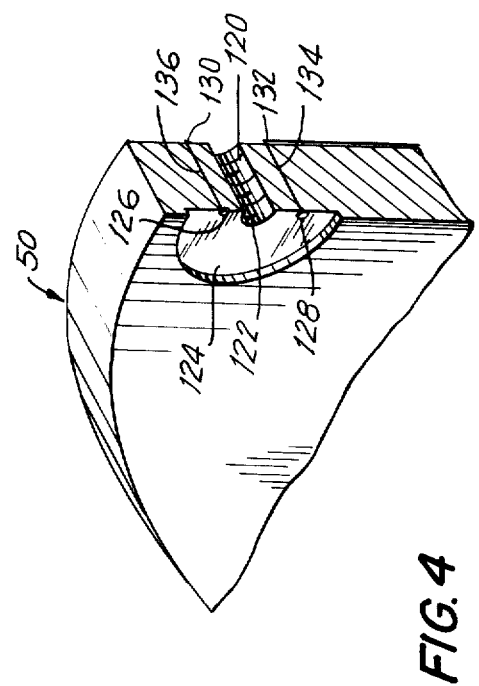

CANNISTER ARRANGEMENT OF TRANSDUCERS TO MONITOR PRESSURES

FIELD OF INVENTION

The invention relates to arrangement for transducers and particularly to arrangements for pressure-electrical signal transducers which are particularly suitable for use in monitoring pressurized telephone cables and the like.

BACKGROUND

Although not limited thereto, the invention is particularly useful in connection with underground cable pressure monitoring systems such as employed by Bell Telephone Laboratories Inc.

In one such known system, pressurized telephone cables are monitored by series of transducers which are mounted in groups and are connected together at a separate junction box which in turn is coupled by means of a spliced case to a cable which leads back to a monitoring or supervising system. An example of a manhole installation is illustrated in Bell Telephone Laboratories development letter LP 1696 which illustrates two pressure transducer housings AT-8652 and one terminal box AT-8653. This arrangement allegedly allows freedom in choice of mounting location for the transducer housings with the limitation that the terminal box must be mounted in horizontal or near horizontal position and in a certain specified attitude.

The junction box includes a housing which encloses a connector block which provides for joining wire pairs from a plurality of transducer housings to a stub which is provided as part of the junction box assembly. This stub can be spliced into a designated cable upon installation for transmitting electrical signals to a remote station.

The pressure transducers which are generally employed in the above are identified as AT-8651 which is a gas-pressure activated switching device by which the pressure of an air input can be determined by the value of electrical resistance measured between two output terminals in a general working air-pressure range of from 0 to 9.5 psig. This unit is not self-contained but must be attached for use to an air-tight cavity such as provided by a transducer housing referred to above as AT-8652. The connection of a cavity to a pressurized cable is effected by means of plastic air tubing.

The aforesaid housing assembly provides a mounting for 1 to 5 transducers in air-tight cavities which provide for air tubing connection to the pressurized telephone cables that are to be monitored.

The aforesaid arrangement is not only difficult to install and dismount but, moreover, requires substantial space for physical emplacement and is as well relatively expensive. It, moreover, does not provide for ease of electrical and pneumatic connection and does not provide optimal avoidance of air leakage or protection for electrical connections.

SUMMARY OF INVENTION

It is an object of the invention to provide an improved transducer assembly or arrangement, especially useful for monitoring pressurized telephone cables although not limited thereto.

It is another object of the invention to provide an improved transducer assembly which provides for ease of electrical and pneumatic connection.

Yet another object of the invention is to provide an improved cannister assembly having minimal size and cost.

Yet another object of the invention is to provide an improved transducer assembly which affords optimal avoidance of pneumatic leakage while simultaneously giving optimal protection against damage to electrical connections.

Still another object of the invention is to provide an improved arrangement which provides for the ready substitution of an alarm device for a transducer.

Another object of the invention relates to the provision of a pivotal mounting which facilitates maintenance and installation.

Still another object of the invention is to provide for the installation of a large number of transducers in a single easily supervisied and maintained enclosure.

Yet another object of the invention is to provide an improved transducer arrangement of relatively light weight.

Still another object of the invention is to provide for improved means accommodating transducers in a sealed enclosure.

To achieve the above and other objects of the invention, there is provided generally a transducer apparatus comprising a casing having an access opening, a closure for obturating said opening, engaging means for holding said casing and closure together in sealed relation, said closure being provided with at least one bore extending therethrough, conduit means supplying to said bore a pressure medium to be monitored, electrical means including electrical contacts adjacent said bore within said casing, and transducer means supported on said closure within said casing, said transducer means being coupled to said bore and contacts and responding to said pressure medium to produce a signal at said contacts.

The enclosure may, in fact, be provided with a plurality of further bores in addition to the first said bore, said conduit means supplying pressure means separately to each of said bores, said electrical means including further electrical contacts adjacent each of said further bores, said transducer means including transducer units in cantilever manner in each of said bores.

According to a feature of the invention, mounting means may be provided on said closure to support said closure, said casing being supported in depending relation relative to said closure.

The transducer means or units may include threaded portions threadably engaged in the aforesaid bore. Moreover, O-rings may be provided between the casing and closure and in axial and radial compression respectively.

The aforesaid electrical means may include a cable, in turn including a plurality of wires extending through said cover. The electrical means may further include a plate of insulating material, conductors on said plate and extending between and coupled to said wires and contacts, at least partly in the manner of a printed circuit.

The plate may be regarded as having opposite surfaces and the contacts are on one surface and the conductors are on the other surface, there being furthermore provided leads extending through the plate and connecting said contacts to said conductors.

The contacts are preferably located at different distances from the bore, and the transducers to be associated therewith are provided with circular style contacts of different radii whereby engagement may be selectively made with the aforesaid contacts.

The transducer means or units of the invention include potentiometers and bellows coupled to and controlling the potentiometers, the bellows being pneumatically coupled to the associated bores in the closure.

The aforesaid casing is preferably cylindrical in shape, whereas the closure is generally circular in configuration. The closure may be provided with radially disposed peripheral slots, the casing including pivotal locking members engageable in said slots.

The aforesaid bores may be arranged in concentric ring alignment and the conduit means may be provided in the form of armored hoses. Nipples are provided on the cables which are threadably engaged in the aforesaid bores.

The aforesaid electrical means may further include a polyvinylchoride sheath surrounding the wires adjacent the closure, the sheath being fixedly connected to the closure. A potting material may be used which permeates the plurality of wires and holds the same in position.

According to a feature of the invention, the transducer units may each include a distal end provided with a slot adapted to accommodate a tool such as a screwdriver for implementing the threaded engagement of the transducer means in the associated bore.

The contacts may be arranged in pairs around each of the said bores, said bores being of equal diameter, the contacts of each pair being arranged at a respective one of the two radii from the center of the corresponding bore, said transducer units having corresponding circular contacts which are brought into engagement with the first said contacts when the transducer units are mounted on the closure.

In addition to the above, O-rings may be mounted between the transducer units and the closure to effect a pneumatic seal therebetween.

According to still a further feature of the invention, if there is an excess number of bores beyond the number of transducer units required, a plug may be provided which will be inserted into said such excess bore to seal off the same.

According to still a further feature of the invention, means may be provided to test the pressure inside of the casing or cannister.

Other objects, features and advantages of the invention will be found in the detailed description which follows hereinafter as illustrated in the accompanying drawing.

BRIEF DESCRIPTION OF DRAWING

In the drawing:

FIG. 2 is an exploded view of a transducer arrangement provided in accordance with one embodiment of the invention;

FIG. 4 is an enlarged view of a detail of the invention;

DETAILED DESCRIPTION

Figure 1:
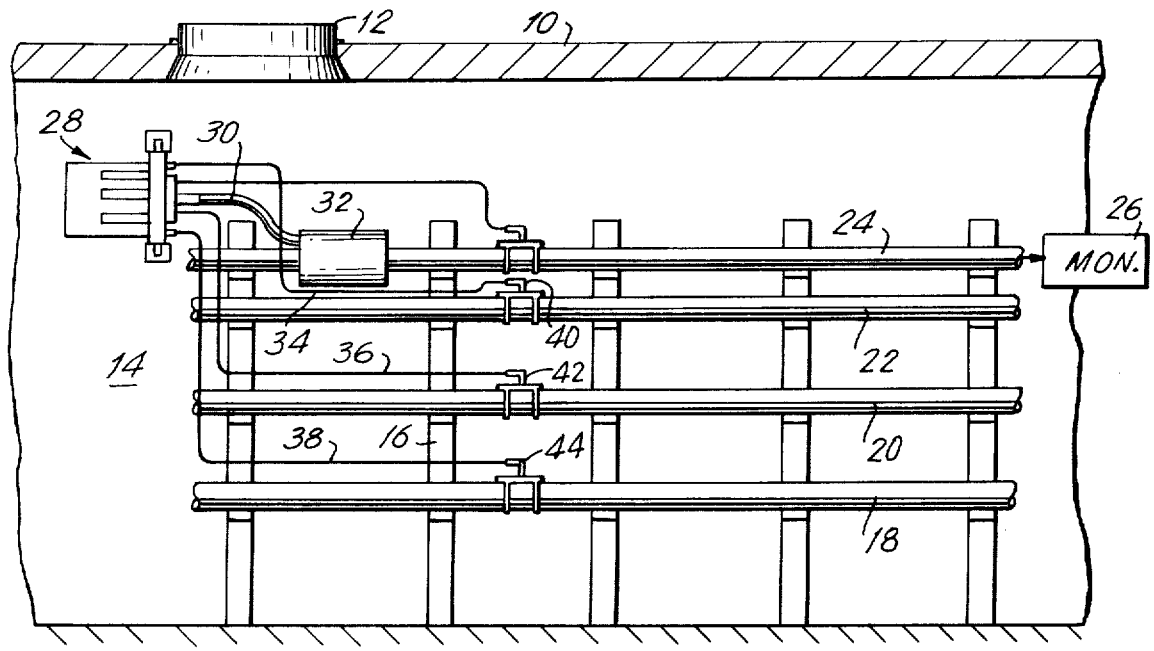
FIG. 1 diagrammatically illustrates a system in which the transducer arrangement of the invention is employed.

FIG. 1 illustrates diagrammatically an underground installation of pressurized telephone cables in which a cannister transducer arrangement of the invention finds ready application.

More particularly, in FIG. 1 the ground level is indicated at 10 with a manhole access indicated at 12 which provides for entry into an underground chamber 14 in which are installed on racks 16 a plurality of pressurized telephone cables indicated generally at 18, 20 and 22. A further cable or pressurized hose is indicated at 24 and is intended for electrical connection to a remote monitoring or supervising device 26 at which are indicated electrical signals generated or controlled by means of a transducer assembly indicated generally 28.

The transducer assembly 28 is an air or pneumatic pressure responsive arrangement which generates physical displacements which in turn are converted into electrical signals which are utilized at the monitor 26. Since the monitor is usually located at a remote site, remote supervision of the pressure in telephone cables 18, 20 and 22 is possible.

The transducer arrangement is provided with an electrical cable 30 which is spliced into the cable 24 by means of a splice case 32, the details of which are known and are of no particular concern to the present invention. The transducer arrangement 28 is moreover provided with a number of pneumatic connections 34, 36 and 38 which are in turn connected to a number of valves 40, 42 and 44 to the cables 18, 20 and 22 in consequence of which the air pressures being maintained within the telephone cables are supervised by the transducer arrangement 28 and electrical signals resulting therefrom are conveyed via cable 24 to the monitoring device 26.

FIG. 2 illustrates in exploded view some of the details of the transducer arrangement 28 referred to hereinabove with respect to FIG. 1. In FIG. 2 are generally illustrated two parts 50 and 52 of a generally wafer-shaped disc-like closure for a cylindrical cannister 54. Also illustrated are a plurality of transducers 56, the details of which will be referred hereinafter.

The cable 30 referred to hereinabove is also illustrated as is, for example, the connection 34 for leading in pressurized pneumatic medium from the associated telephone cable (not shown).

As is seen, the cable 30 consists of a plurality of wires 58 arranged in pairs and surrounded in a potting material 60 which permeates the plurality of wires and holds the same in position adjacent a section 62 of increased diameter, the wires being encased in a polyvinylchloride sheath 64 which is rigidly connected to the closure section 52.

The closure section 52 is preferably made of a polycarbonate resin such as, for example, Lexan which is a trademark product of the General Electric Company. The closure may also be fabricated of a metal such as stainless steel, preferably provided with a non-conductive coating. Other materials both synthetic and natural may also be employed.

The configuration of the section 52 is generally circular. It consists of an outer part 70 provided with a number of radially disposed peripheral slots such as indicated at 72. The closure is also provided with an opening 74 through which the aforesaid cable 30 extends.

In the section 70 is installed an O-ring 80 which axially abuts against the cannister 54 and is under axial compression. The other section 82 is also provided with an O-ring such as indicated at 84, this O-ring abutting radially against the cannister 54 and therefore being under a radial compression so that the closure is sealed to the cannister 54 in both axial and radial directions. The O-rings mentioned hereinabove are preferably manufactured of a material known as Viton.

A yoke 90 straddles and is pivotally connected to closure section 52 by pivot pins such as indicated at 92. The yoke 90 consists of parallel arms 94 and 96 and the traverse 98 in which are provided holes 100, 102 and 104 which serve the purpose of enabling the mounting of the traverse 98 on a rigid supporting structure. Normally, the yoke 90 will be held in fixed position thereby enabling the closure section 52 and the cannister attached thereto to be pivotally displaced to facilitate maintenance and supervision of the transducer arrangement being illustrated.

In addition to the above, the closure section 52 is provided with a plurality of bores such as, for example, illustrated at 110. These bores are provided with outwardly disposed threaded sections 112 by means of which threaded engagement is affected between the pneumatic cable 34 and the transducer to be associated therewith. The cable 34 is, of course, only exemplary of the many connections which can be made to the unit of the invention.

More particularly, the pneumatic cable 34 is provided with a nipple 114 having a threaded portion 116 which is engaged in the threaded portion 112 of the associated bore 110. A swage fitting is provided at 118 by means of which connection is made with the armored hose or cable 121 which provides a relatively injury proof connection between the cannister transducer arrangement of the invention and the telephone cable to be monitored.

Referring next to the other section 50 of the closure, this section is preferably made of one or two layers of an insulating material. A particularly suitable material which has been contemplated is a glass-base epoxy resin as identified in Specification MIL-P-18177 C. As will be shown, on the surface of section 50 facing closure section 52, there is provided printed wire circuitry in the form of copper cladding which, in turn, is gold plated as per Specification MIL-STD-275C.

The closure section 52 is provided with a plurality of bores 120 aligned with and co-axial with the bores 110 in the closure section 52. The bores 120 are provided with respective threaded sections 122 by means of which threaded engagement is made with the respective transducer units one of which is to be described in greater detail hereinunder.

Concentric with each of the bores 120 and in correspondence therewith are recessed sections 124 in which are located respective contacts 126 and 128 (see also FIG. 4). Contacts 126 and 128 are preferably of silver or the like and are the contacts with which the transducer units make electrical connection. The contacts 126 and 128 also have electrical connection with respective pairs of wires in the cable 30.

This connection is effected by means of conductors 130 and 132 which lie on the surface of the closure section 50 facing the closure section 52 in a manner which will be indicated in greater detail hereinafter. Leads 134 and 136 extend perpendicular through the closure section 50 to provide connection between the conductors 130 and 132 and the contacts 128 and 126 respectively.

The closure section 50 is provided with an opening 140 which is subsequently filled with a potting material indicated at 142 to seal in the extremities of the wires 58 and hold the same in fixed position after electrical connection has been made between the wires and the printed circuitry to be described hereinafter.

A plurality of transducer units 144 are shown mounted in cantilever manner on closure section 50 such that they can be readily and independently removed. One transducer unit 144 is shown in some external detail in FIG. 3. It is provided with a threaded nipple 146 for engaging the threaded section 122 of the associated bore 120. Through the nipple 146, as will be seen, pneumatic connection is made through the bore 120 and the bore 110 to the associated pneumatic cable 34.

The distal end 148 (FIG. 2) of transducer unit 144 is provided with a slot 150, this slot accommodating the insertion of the end of a screw-driver or other such tool by means of which threaded engagement between nipple 146 and thread 122 is greatly facilitated.

The casing or cannister 54 is generally of cylindrical shape having a closed end indicated at 152 and an open end indicated at 154. The open end is provided with hinges, such as indicated at 156 which accommodate pivotal locking members, such as indicated at 158 which extend into the slots 72 on closure section 52 and are locked therein by threaded adjustment of tightening members 160. It will be understood that the transducer units mounted on the closure are covered and protected against ambient conditions by the casing or cannister 54 which is locked into position on the closure by means of the aforedescribed pivotal locking members. It is also seen that the casing is readily removed so that transducer units may be readily installed and serviced or even perhaps replaced by other substitute elements such as alarm members or plugging members, the purpose of which is to obturate any of the bores 110-120 which are not being employed in connection with transducer units.

Figure 3:
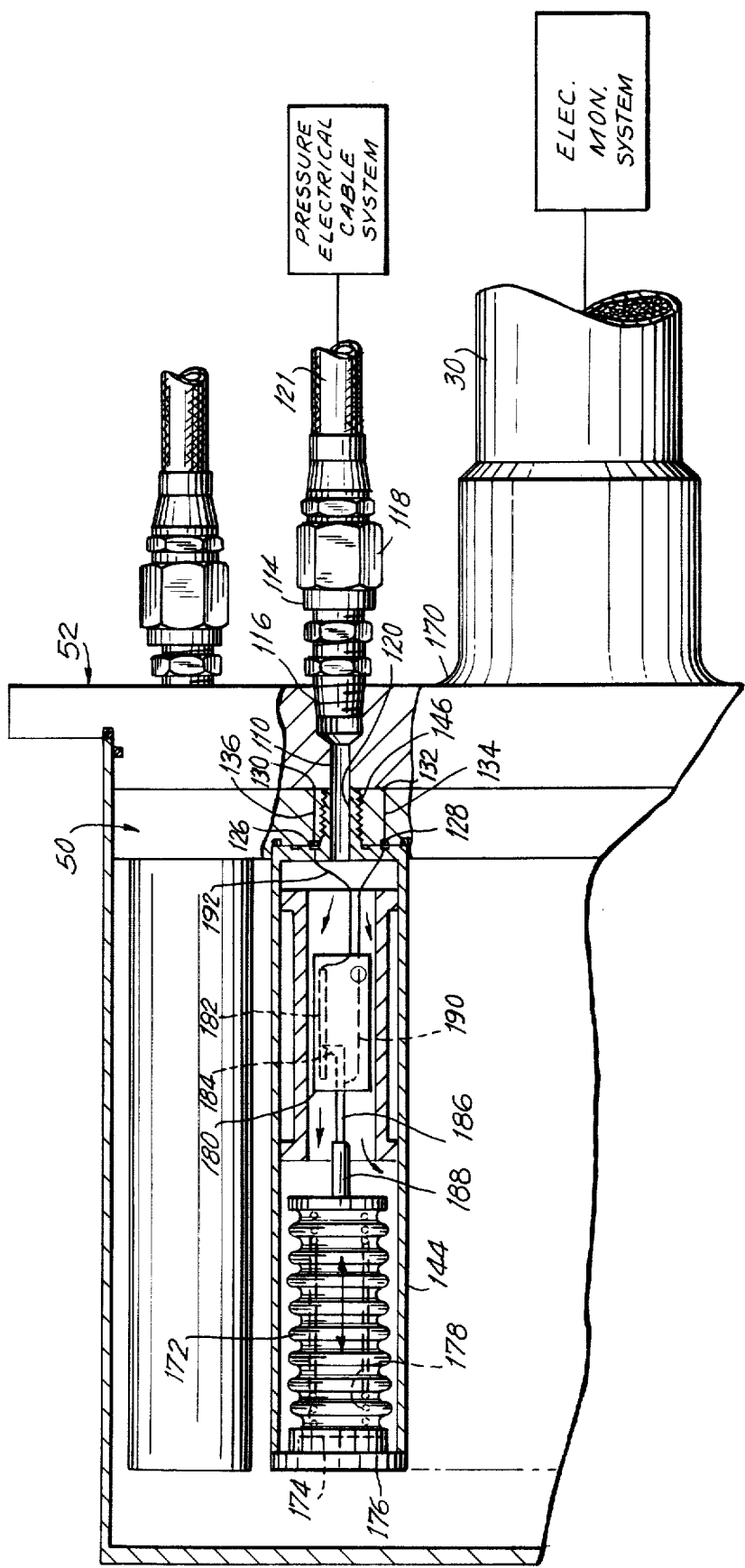
FIG. 3 is a fragmentary side-view of the assembled transducer arrangement of FIG. 1 illustrating some deails of the transducer unit which is employed therein.

In FIG. 3, a fragmentary portion of the transducer arrangement of the invention is shown in assembled condition. Therein is seen the armored cable 121 leading from an associated telephone cable, the pressure of which is to be supervised via swage connection 118 to threaded nipple 116 into the bore 110 in closure section 52 and thence into the bore 120 in closure section 50 in which is engaged the threaded nipple 146 of transducer unit 144.

The cable 30 appears as connected to the closure section 52 by means of connector fillets 170 and the conductors 130 and 132 are generally and diagrammatically indicated, these being connected to contacts 126 and 128.

Installed within the transducer 144 is a bellows 172 mounted on a protrusion 174 extending inwardly of the unit from the end 176 of the unit. The bellows 172 is internally provided with a spring 178 of helical form tending generally to hold the bellows in extended configuration.

Also installed within the unit 144 is a resistor mount 180 on which is mounted a resistor 182. The resistor 182 is engaged by the wiper 184 mounted on an arm 186 connected to the bellows 172 by means of a supporting member 188.

The internal chamber defined within the transducer unit 144 is connected through bore 110–120 to armored hose 121 and thence back to the telephone cable, the pressure which is being supervised. It will be seen that as the pressure within the hose 121 increases and decreases, the expansion and contraction of bellows 172 will follow accordingly and this will cause a suitable displacement of the wiper 184 on the resistor 182, in consequence whereof an electrical signal can be generated.

More particularly, two thin flexible wires 190 and 192 are connected to the contacts 126 and 128. Wire 190 is connected to wiper 184 whereas wire 192 is connected to one end of resistor 182. It will thus be seen that the amount of resistance coupled between the wires 190 and 192 is controlled by the position of the wiper 184 on the resistor 182. This will, in turn, cause the generation or control of an electrical signal on the conductors 130 and 132 and, accordingly, in the corresponding pair of wires in the cable 30 which is connected to the electrical monitoring system or supervising system.

FIG. 4 illustrates, an enlarged scale, the contacts 126 and 128 included in the recess 124 associated with each of the bores providing pneumatic connection with the transducer units. The arrangement of the contacts 126 and 128 is additionally shown in FIG. 5 wherein some further features of the invention are to be found.

Figure 5:
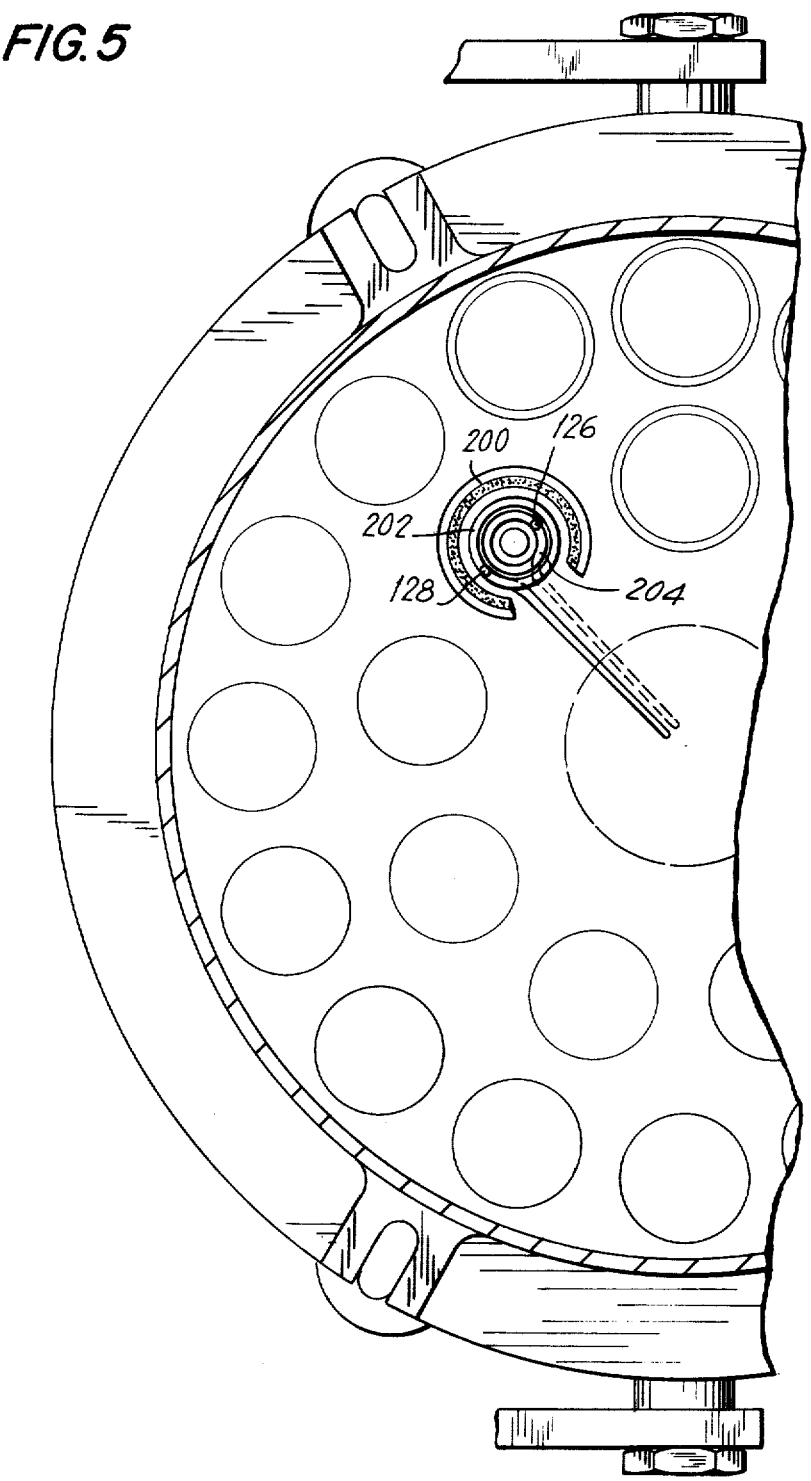
FIG. 5 is a top partially diagrammatic view of a slightly modified embodiment of the invention.

More particularly, in FIG. 5 is illustrated an additionally O-ring 200 also preferably formed of Viton and sandwiched between the transducer and the closure section against which the transducer abuts. This O-ring affords a pneumatic seal and confines the flow of pressure medium so that the exact pressure appearing in the armored hose 121 is the pressure appearing within the transducer unit and controlling the associated bellows.

Also appearing on the proximal end of the transducer unit are the circular contacts 202 and 204 which are provided to engage with the contacts 126 and 128. Thus, as the transducer is threaded into position in the associated bore, contact will be made with the contacts 126 and 128 irrespective of the ultimate angular position of the transducer in its bore. For this reason, the contacts 126 and 128 as well as the circular contacts 202 and 204 are arranged at one of two different radial distances from the center of the bore so that selective and respective engagement will be made with and between the different contacts. This means that no particular adjustment of the contacts is necessary nor is there any wiring or wire terminal problem to be encountered since installation of the transducer unit in an associated bore will at once establish pneumatic and electrical contact with no precise adjustments being required and with a strict integrity of connection being afforded, both in an electrical and in a pneumatic sense.

Figure 6:
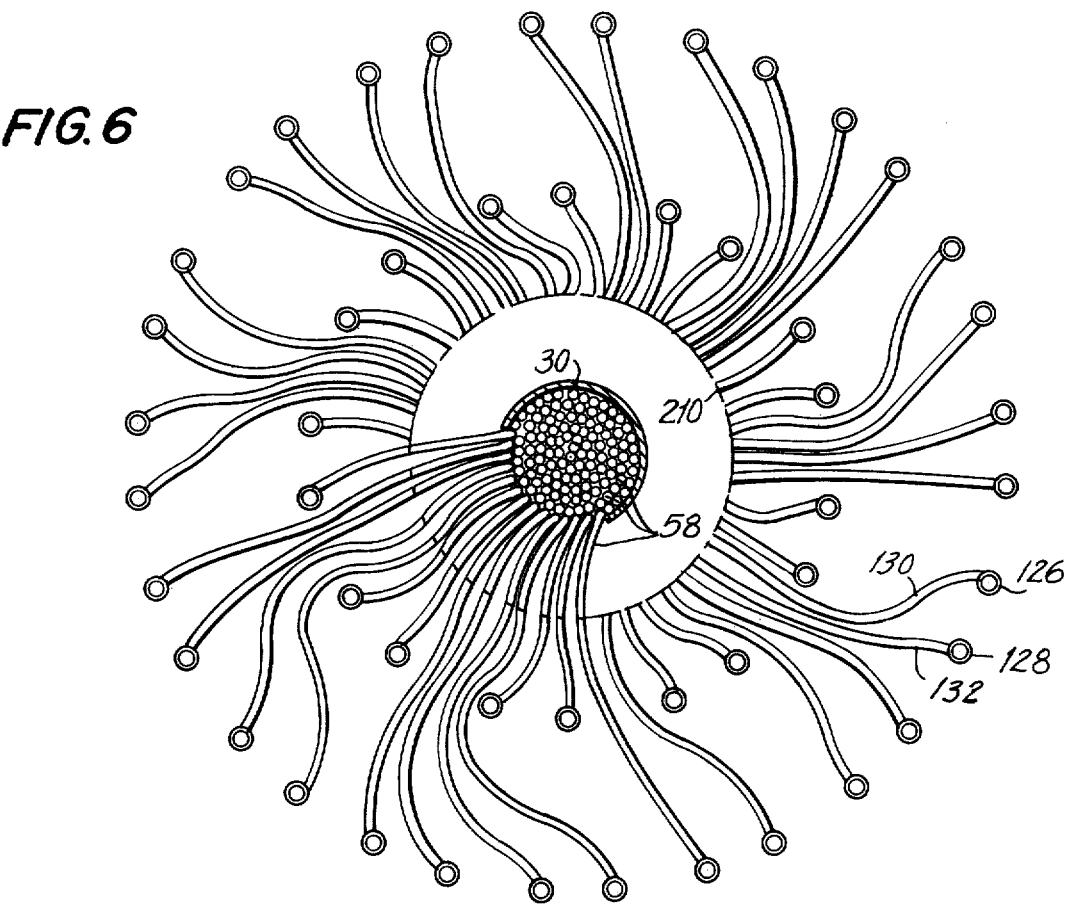
FIG. 6 illustates a printed circuit arrangement for making connection between external wires and the terminals of the transducer units employed in accordance with the invention.

FIG. 6 illustrates diagrammatically the connection to be made between the cable indicated generally at 30, and the wires 58 extending therefrom, with the printed circuitry affording connection between the pairs of contacts indicated generally at 126 and 128. As has been indicated hereinabove, the conductors 130 and 132 are conductors of the printed circuit type. They are preferably gold plated copper cladding extending from positions corresponding to those of the contacts 126 and 128 to interior ends 210 to which soldered connections are made between the wires 58 and the respective contacts. It will of course be understood that the leads 134 and 136 are necessary between the conductors 130 and 132 and contacts 126 and 128 respectively inasmuch as the conductors are on the opposite side of closure section 50 from the side bearing the contacts 126 and 128.

From what has been indicated hereinabove, it will now be apparent that a pressure medium may be fed to any one of a number of armored hoses such as indicated at 121 through bores 110–120 to transducer units such as indicated at 124 to act on bellows 172 and control the amount of resistance 182 connected between wires 190 and 192 (FIG. 3). This amount of resistance is used to control the voltage between conductors 130 and 132 which identify with conductor or wire pairs in cable 130 thereby feeding an electrical signal back to a monitoring system or the like generally and preferably located at a remote station. Thereby, the amount of pressure being maintained in telephone cables installed underground can be monitored and supervised from a remote station by an installation which is small and lightweight and provides for its own ready installation and maintenance as well as the ready installation and maintenance of transducer units contained therein. At the same time, it will be readily appreciated that a mounting is provided which accommodates a larger number of transducer units within a relatively small space.

While a particular transducer unit has been generally indicated hereinabove, it will be appreciated that there are a wide variety of potentiometers or transducer units which are useful in the arrangement of the invention. Thus, for example, a linear motion potentiometer such as Bourns Inc. Model 141 may be employed in association with a bellows to give the desired affect as long as the unit is otherwise incorporated into an installation such as has been described or is defined by the claims which follow hereinafter.

From what has been indicated above, it will now be appreciated that there is provided, in accordance with the invention, a transducer apparatus which comprises a casing having an access opening, there being a closure provided in one or more sections for obturating the opening, engaging means for holding the casing enclosure together in sealed relation, said closure being provided with a bore extending therethrough, conduit means supplying to said bore a pressure medium to be monitored, electrical means including electrical contacts adjacent said bore within said casing and transducer means supported on said closure within said casing, said transducer means being coupled to said bore and contacts and responding to said pressure medium to produce a signal at said contacts.

The aforesaid casing as well as the mounting means therefore may be provided in the form of stainless steel such as, for example, stainless steel 316 whereas the outer closure section 52 may be, for example, of a plastic such as a polycarbonate resin. Other materials both natural and synthetic may be employed in place of the above, although the specified materials are preferred.

The closure may furthermore be provided with an additional number of bores with the conduit means including a plurality of armored cables associated with respective of the bores. The electrical means may include further electrical contacts adjacent each said further bore with transducer means being provided accordingly. If there are more bores than transducer means, plugs may be employed for closing these additional bores. These plugs may consist of units substantially like the transducer unit 144 which has been illustrated except that the interior of the unit 144, when it is to form a plug, consists of a solid potting material.

It will also been seen that the invention contemplates the provision of mounting means on the aforesaid closure to support the same and casing, the casing being supported in depending or suspended relationship on the closure.

Also seen as one of the features is the arrangement of the transducer means including a threaded portion threadably engaged in the aforesaid bore. As another feature, will be and the closure, these O-rings being respectively in axial and in radial compression.

The electrical means mentioned hereinabove may be considered as including the cable having therein the plurality of wires extending through the closure. The electrical means may further include the plate of insulating material identified in the above description as the closure section 50 whereon are arranged a plurality of conductors in the manner of a printed circuit arrangement which extend between the wires of the cable 30 and the contacts 126 and 128.

As has been described above, the plate or section 50 has opposite surfaces with the contacts on one surface and the conductors on the other surface, there being provided leads extending through the plate and connecting the contacts to the conductors.

As has been noted hereinabove, the contacts are located at different distances or radial locations from the center of the bore and the transducers are provided with circular contacts for engagement therewith. The transducers preferably include potentiometers and bellows coupled to and controlling the potentiometers which in turn are formed of resistors and wipers in the manner described hereinabove.

The casing is preferably cylindrical in shape as are the transducer units and the closure is generally circular in configuration to provide for minimum difficulties in installation and maintenance.

As has been shown, the closure is provided with radially disposed peripheral slots, the casing being provided with pivotal locking members engageable in the slots to hold the closure and casing together.

In one of the embodiments noted hereinabove, the bores are arranged in concentric ring alignment but in all embodiments the conduit means is preferably an armored cable or a plurality of armored cables by means of which injury proof connection can be made between pressurized cables to be supervised and the transducer units of the invention.

Under certain limited circumstances, it may be possible to use the closure member alone independent of the casing which protects the transducer devices, the closure in this case constituting a support on which a plurality of transducer units can be mounted with the arrangement offering the prospect of ready pneumatic and electrical connection between external sources of pneumatic medium and electrical circuits. In most cases, however, the casing or cannister is preferably employed and, in fact, the cannister may very well have provision for evacuation of the interior of the same so that the transducers are maintained in a sterile evacuated environment.

There will now be obvious to those skilled in the art many modifications and variations of the arrangements and systems described hereinabove. These modifications and variations will not depart from the scope of the invention if defined by the following claims.

What is claimed is:

1. Transducer apparatus comprising a casing having an access opening, engaging means for holding said casing and closure together in sealed relation, said closure being provided with a bore extending therethrough, conduit means supplying to said bore a pressure medium to be monitored, electrical means including electrical contacts adjacent said bore within said casing, and transducer means supported on said closure within said casing,, said transducer means being coupled to said bore and contacts and responding to said pressure medium to produce a signal at said contacts, said closure being provided with a plurality of further bores in addition to the first said bore, said conduit means supplying pressure medium separately to each of said bores, said electrical means including further electrical contacts adjacent each of said further bores, said transducer means including transducer units in each of said bores.

2. Apparatus as claimed in claim 1 wherein said electrical means includes a cable including a plurality of wires extending through said closure.

3. Apparatus as claimed in claim 2 wherein said electrical means includes a plate of insulating material, conductors on said plate and extending between and coupled to said wires and contacts.

4. Apparatus as claimed in claim 3, wherein said plate has opposite surfaces and said contacts are on one surface and said conductors are on the other surface, comprising leads extending through said plate and connecting said contacts to said conductors.

5. Apparatus as claimed in claim 4 wherein said contacts are located different distances from said bore.

6. Apparatus as claimed in claim 2 wherein said electrical means further includes a polyvinylchloride sheath surrounding said wires adjacent said closure, said sheath being fixedly connected to said closure.

7. Apparatus as claimed in claim 6 comprising a potting material permeating said plurality of wires and holding said wires in position.

8. Apparatus as claimed in claim 1 wherein said conduit means includes a plurality of armored hoses respectively coupled to said bores, and nipples on said hoses and threadably engaged in said bores.

9. Apparatus as claimed in claim 1 wherein the contacts are arranged in pairs around each bore, said bores being of equal diameter, the contacts of each pair being arranged at a respepctive one of two radii from the center of the corresponding bore, said transducer units having corresponding circular contacts which are brought into engagement with the first said contacts when the transducer units are mounted on said closure.

10. Apparatus as claimed in claim 9 comprising O-rings between said transducer units and said closure.

11. Apparatus as claimed in claim 1, wherein said closure is provided with at least one further bore, comprising a plug inserted in the latter said bore to seal off the same.

12. Apparatus as claimed in claim 1 wherein said bores are arranged in concentric-ring alignment.

13. Transducer apparatus comprising a casing having an access opening, engaging means for holding said casing and closure together in sealed relation, said closure being provided with a bore extending therethrough, conduit means supplying to said bore a pressure medium to be monitored, electrical means including electrical contacts adjacent said bore within said casing, and transducer means supported on said closure within said casing, said transducer means being coupled to said bore and contacts and responding to said pressure medium to produce a signal at said contacts, said casing and closure being generally circular in configuration, said closure being provided with radially disposed peripheral slots, said casing including pivotal locking members engageable in said slots.

14. Transducer apparatus comprising a member having opposite sides and provided with a plurality of bores, a cable attached to one side of said member and including a plurality of wires, contacts on the other side of the member around said bores, connections between the contacts and wires, transducer units insertable into the bores and including means to engage said contacts and to communicate with said bores, said units being located on said other side of said member, and pressurized means on said one side of said member to supply to said bores pressure medium to be monitored, said transducer units including means to convert pressure changes in said pressure medium into physical displacements in turn operative to generate electrical signals on said wires.

15. Apparatus as claimed in claim 14 comprising means pivotally supporting said member.

16. Apparatus as claimed in claim 14 comprising cannister means on and sealably engaging said other side of said member and surrounding and protecting said transducer units.

17. Apparatus as claimed in claim 16 wherein said cannister means is stainless steel and at least said one side of said number is of polycarbonate resin.

18. Apparatus as claimed in claim 17 wherein said other side of said member is of glass-bore epoxy resin.

19. Apparatus as claimed in claim 14 wherein said pressurized means includes pressurized telephone cables and armored cables connecting said telephone hoses to said pressurized bores and thereby to said transducer units.

20. Apparatus as claimed in claim 16 comprising means to test the pressure inside said cannister means.

21. Apparatus comprising means for defining a chamber and including a casing and a generally wafer-shaped closure for said casing, means for holding the casing and closure together in detachable relation, said closure being provided with a plurality of bores extending therethrough, conduit means for supplying to at least some of said bores a pressure medium to be monitored, a plurality of transducer means separately mounted in cantilever manner on said closure within said chamber and in communication with those of said bores to which said pressure medium is supplied, and electrical means extending through said closure and having respective electrical connections with said transducer means for the transmission of electrical signals from the latter, said casing being removable from said closure to expose said transducer means for access to the same.

22. Apparatus as claimed in claim 21 comprising a yoke straddling and pivotally connected to said closure to support the latter.

23. Apparatus as claimed in claim 21 comprising a plurality of pressurized telephone cables coupled by said conduit means through respective of said bores to said transducer means.

24. Apparatus as claimed in claim 23 comprising remote monitoring means to which said electrical means is coupled.

25. Apparatus as claimed in claim 21 wherein each said transducer means includes a potentiometer and a bellows coupled to and controlling said potentiometer, said bellows being pneumatically coupled to said the corresponding bore.

26. Apparatus as claimed in claim 21 wherein said casing is cylindrical in shape and said closure is generally circular in configuration.

27. Apparatus as claimed in claim 21 wherein each said transducer means includes a threaded portion threadably engaged in said bore.

28. Apparatus as claimed in claim 29 wherein each said transducer means includes a distal end provided with a slot adapted to accommodate a tool for implementing the threaded engagement of the transducer means in said bore.

29. Apparatus as claimed in claim 21 comprising O-rings between said casing and closure and in axial and radial compression respectively.

30. Apparatus as claimed in claim 21 wherein said conduit means includes at least one armored hose communicating with one of said bores.

* * * * *